Feb. 26, 1963 G. E. WEBB 3,078,503
BIRD BUTCHERING TOOL
Filed Nov. 28, 1960
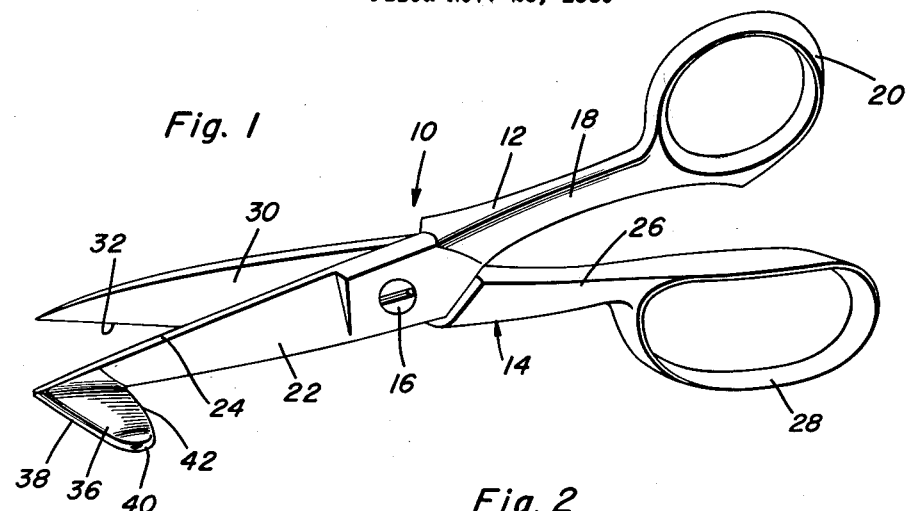
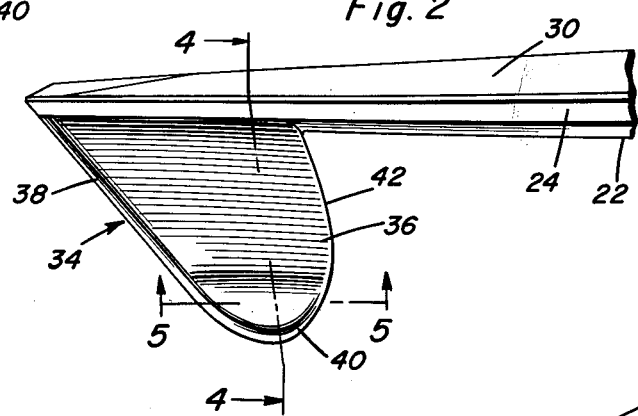
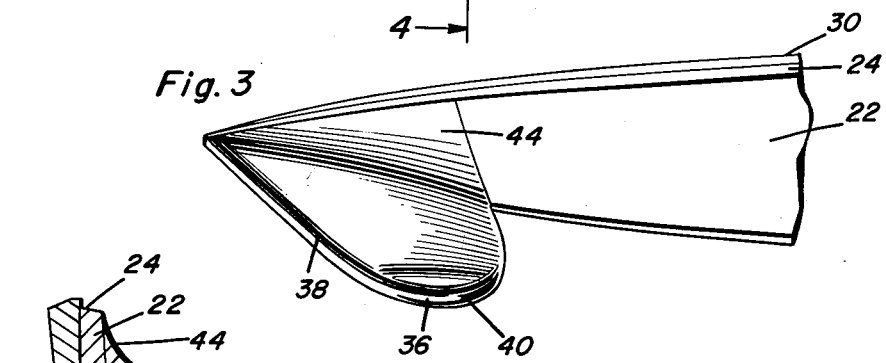
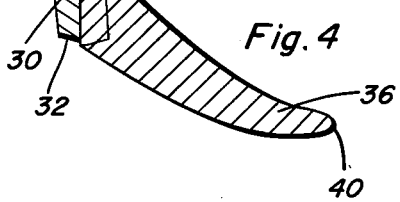
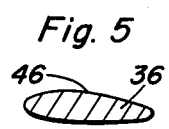
George E. Webb
INVENTOR.

United States Patent Office 3,078,503
Patented Feb. 26, 1963

3,078,503
BIRD BUTCHERING TOOL
George E. Webb, 792 Highway 35 N., Forest, Miss.
Filed Nov. 28, 1960, Ser. No. 72,072
2 Claims. (Cl. 17—11)

The present invention generally relates to a butchering tool and more particularly a tool for use in butchering poultry and materially assists in certain novel steps in eviscerating a bird, fowl or the like.

In the poultry industry, a conventional pair of shears is normally employed for use in dressing poultry but it is quite time consuming since it quite often is necessary to grasp certain internal components of the bird or fowl and hold it or gradually pull on it while it is cut free by using the shears. Therefore, it is the primary object of the present invention to provide a novel butchering tool in which one blade of the conventional shears is provided with a laterally extending projection of a particular shape, size and orientation which may be employed for lifting various components and otherwise guiding the shears in relation to the various internal organs and other internal components of a bird thus enabling the bird to be more effectively butchered with the least possible expenditure of effort and time and with the least possible waste and contamination from fecal material and the like.

Another important object of the present invention is to provide a butchering tool in the form of a pair of conventional shears having a laterally extending lug thereon which is inclined towards the handle portion of the shears and inclined downwardly and away from the cutting edges of the blade thereby forming a structure which is quite simple, long lasting, effective for its particular purposes and generally inexpensive to manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of the butchering tool of the present invention;

FIGURE 2 is an enlarged fragmentary plan view of the laterally extending projection of the construction of FIGURE 1;

FIGURE 3 is an enlarged fragmentary side elevational view of the laterally extending projection of the construction of FIGURE 1;

FIGURE 4 is a transverse, sectional view taken substantially upon a plane passing along section line 4—4 of FIGURE 2 illustrating the details of construction of the lug mounted thereon; and FIGURE 5 is a detailed sectional view taken substantially upon a plane passing along section line 5—5 of FIGURE 2 illustrating the cross sectional configuration of the lug mounted on one blade of the shears.

Referring now specifically to the drawings, the numeral 10 generally designates the butchering tool of the present invention which includes two elongated members 12 and 14 which are disposed in crossed intersecting relationship to each other and pivotally interconnected by a fastening bolt 16. The member 12 includes a handle portion 18 on one side of the pivot bolt 16 with the handle portion 18 having a generally circular loop 20 thereon. The elongated member 12 is provided with a blade 22 on the opposite side of the pivot bolt 16 and the blade 22 is tapered to a pointed outer end and also is tapered from a thick lower edge to a relatively narrow upper edge and the narrow upper edge is beveled to form a sharpened edge 24.

The other elongated member 14 is provided with a handle portion 26 and an elongated loop 28 on one end thereof and a blade 30 on the other side of the pivot bolt 16 and the blade 30 is similar in structure to the blade 22 and is provided with a sharpened edge 32 for coaction with the edge 24 for cutting material disposed therebetween. The foregoing structure represents substantially conventional shears as presently employed in the poultry butchering industry for cutting various internal components of poultry during the butchering operation.

The present invention includes a laterally extending element generally designated by reference numeral 34 that is rigidly mounted on the outer surface of the blade 22 and is generally in the form of a laterally extending lug 36 which has a leading edge 38 inclined towards the pivot bolt 16 and also inclined downwardly away from the horizontal plane of the edge 24. The lug 36 is provided with a rounded outer end edge 40 and a slightly rounded or curved trailing edge 42. The major part of lug 36 is downwardly inclined and is also longitudinally rounded on the top surface thereof with the trailing portion of the lug curving sharply upwardly at the inner end thereof as designated by numeral 44 whereby the terminal end edge of the trailing portion of the lug is coincidental with the sharpened edge 24 and the major portion of the trailing edge 42 is inclined downwardly from the bottom edge of the blade 22 thus providing somewhat of a concave curvature across the top surface of the lug 36 generally coincidental with the lower edge of the blade 22. As shown in FIGURE 4, the lug 36 is turned slightly up at about one-fifth of the distance from the blade and the tip is bent up towards a horizontal plane perpendicular to the blade.

As illustrated in FIGURE 5, the top surface 46 of the lug 36 is slightly convex in curvature from the leading to the trailing edge and also, the thickness of the lug 36 tapers laterally outwardly from the blade 22 as illustrated in FIGURE 4.

In using the tool of the present invention, the bird is grasped in the left hand by placing the thumb over the leg disposed on the operator's left side with the fingers being disposed under the back of the bird. The unaltered tip of the blade 30 is inserted into the bird at the base of the tail at an angle which causes the blade to slip into the body cavity on a line between the back of the bird and the terminal portion of the gut so that the gut and cloacia are not cut open. The tip of the blade having the lug thereon remains outside the bird while the shears are closed partially to enlarge the original opening and this first cut is made with the palm of the hand having the shears therein facing upwardly.

Next, the shears are withdrawn from the bird and the palm of the hand is turned 90 degrees to the left and this places the shears in position to make the second cut. The second cut is made by inserting the tip of the blade having the lug thereon into the previous opening so that the blade slips in between the right edge of the opening and the terminal portion of the gut. After the tip has been inserted into the opening, the blade is pressed forward to the point of the breast in such a way that all the intestines are under the blade when the blade is in this position, the shears are closed thus providing the second cut.

The blade is now pressed down on the intestine and over against the side of the bird which is to the operator's left. Now, the shears are pressed toward the left side of the operator and are turned approximately 45 degrees to the left and withdrawn from the bird. When this is done, the back side of the lug will pick up the gut and cloacia and bring them out of the bird. As the point of the shears clears the body cavity, the blades are open and the tip with the projection or lug thereon is slipped forward between the bird and the gut while the other tip is slipped in front of the vent. Now, the shears are closed and the vent is cut-off from the body of the bird thus completing the operation of opening the bird and cutting the vent.

One of the advantages of the present invention is the change in the operation of opening the bird and cutting the vent from a two step operation to a single step operation. Also, the present instrument eliminates the use of the knife and thus cuts down the risk of the operator being injured as well as cutting down on the contamination due to accidental cutting of the intestines and will represent a considerable saving in labor required in opening a bird and cutting the vent.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A bird butchering tool comprising a pair of shears including two pivotally interconnected and crossed elongated members, a rear end of each member having a loop-type handle thereon, one of the loop-type handles being generally circular for receiving the thumb, the other loop-type handle being elongated for receiving the fingers of the hand for manipulation of the handles toward and away from each other, a forward end of each of the members having a sharpened and tapered blade with the sharpened edges passing each other for shearing material therebetween, said blade on the member having the generally circular loop-shaped handle having a laterally extending lug at the tip end thereof, said lug extending outwardly from the exterior surface of the blade and having a rounded outer end, said lug being tapered longitudinally outwardly and having a leading edge inclined rearwardly from the forward end of the blade on which it is secured to the rounded outer end, a trailing edge of the lug also being inclined rearwardly from said outer end toward the blade on which it is secured, the inner portion of the trailing edge and the adjacent area of the lug curving upwardly and merging with the sharpened edge of the blade, said lug being inclined downwardly away from the sharpened edge at its inner end and curving upwardly at the outer end and having the upper surface thereof slightly convex for use in manipulating the internal components of a bird for facilitating the removal thereof.

2. In a bird butchering tool, a pair of pivotally connected, crosssed elongated members, each of said members having a handle adjacent one end thereof and a blade with a cutting edge adjacent the other end thereof, the blades being of substantially the same length and having pointed tip ends, a lateral projection on one of said blades merging with the tip thereon and extending outwardly from said blade in a direction away from the cutting edge thereon, a leading edge on said projection extending from said tip and inclined rearwardly therefrom, a rounded outer edge adjoining said leading edge, and a trailing edge adjoining said rounded outer edge and extending rearwardly therefrom, the cutting edges on said blades being oppositely disposed in cutting relation to each other.

References Cited in the file of this patent
UNITED STATES PATENTS

| | | |
|---|---|---|
| 1,129,685 | Jones | Feb. 23, 1915 |
| 1,600,225 | Halpern | Sept. 21, 1926 |
| 2,873,526 | Visconti | Feb. 17, 1959 |